United States Patent [19]
Johnson et al.

[11] 4,262,461
[45] Apr. 21, 1981

[54] GEODESIC DOME CONNECTOR

[76] Inventors: Janet B. Johnson; Dennis O. Johnson, both of Route #3, Box 105-D, North Branch, Minn. 55056

[21] Appl. No.: 28,573

[22] Filed: Apr. 9, 1979

[51] Int. Cl.³ .......................... E04B 1/32; E04B 1/40
[52] U.S. Cl. .......................................... 52/81; 52/646; 52/648; 52/DIG. 10; 403/172; 403/252
[58] Field of Search .................. 52/81, 171, 172, 638, 52/646, 648; 403/252, 254, 255, 49, 374, 409, 169–172, 217

[56] References Cited

U.S. PATENT DOCUMENTS

| | | | |
|---|---|---|---|
| 3,186,522 | 6/1965 | McCauley | 52/81 X |
| 3,323,820 | 6/1967 | Braccini | 52/81 X |
| 3,486,278 | 12/1969 | Woods | 52/81 |
| 3,810,342 | 5/1974 | Scott | 52/81 |
| 3,844,664 | 11/1974 | Hogan | 403/171 |
| 3,978,634 | 9/1976 | Mack et al. | 52/646 |
| 3,992,118 | 11/1976 | Siegers | 403/374 |
| 4,099,888 | 7/1978 | Simone | 403/172 |
| 4,129,975 | 12/1978 | Gabriel | 52/648 |

FOREIGN PATENT DOCUMENTS

| | | | |
|---|---|---|---|
| 2053228 | 5/1972 | Fed. Rep. of Germany | 152/81 X |
| 1171313 | 10/1958 | France | 52/646 |
| 1300613 | 6/1962 | France | 403/254 |
| 929862 | 6/1963 | United Kingdom | 52/81 |

*Primary Examiner*—J. Karl Bell
*Attorney, Agent, or Firm*—Schroeder, Siegfried, Ryan, Vidas, Steffey & Arrett

[57] ABSTRACT

A connector for interconnecting joists which define triangular panel roof areas of a geodesic dome and comprised of a metal sleeve having a plurality of circumferentially spaced openings extending therethrough and a plurality of metal tongues secured to the adjacent ends of the joists at their junction point and extending radially inwardly through the sleeve openings, each having a tapered pin extending through its tongue and bearing against the inner surface of the sleeve to cam the joists' ends against the exterior of the sleeve and thereby hold the same in rigid fixed relation to the sleeve.

11 Claims, 5 Drawing Figures

GEODESIC DOME CONNECTOR

This invention relates to an improved connector device for rigidly interconnecting the apexes of a plurality of triangular panels which conventionally collectively form a geodesic dome roof.

It is a general object of our invention to provide a novel and improved simple and inexpensive and more effective device for interconnecting the triangular sections of a geodesic dome at their apexes.

A more specific object is to provide a simple and inexpensive connector for such triangular sections which is quick and easy to assemble or disassemble and provides improved rigidity, safety and security.

Another object is to provide a simple and inexpensive connector which will provide improved performance and may be utilized with joints made of any rigid material.

Another object is to provide a novel and improved connector for such triangular sections which has a minimum of parts, is universally applicable, and automatically compensates for dimensional tolerances of the individual triangular sections.

These and other objects and advantages of the invention will more fully appear from the following description, made in connection with the accompanying drawings, wherein like reference characters refer to the same or similar parts throughout the several views, and in which.

Figure 1:
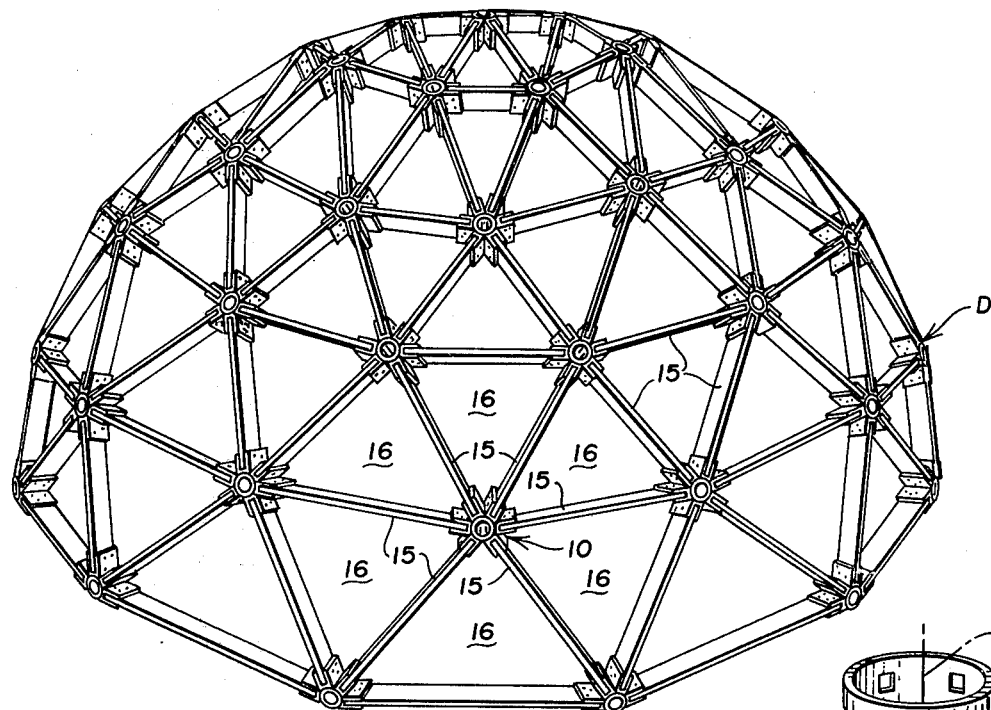
FIG. 1 is a perspective view of a geodesic dome utilizing a plurality of our geodesic dome joist connectors.
Figure 3:
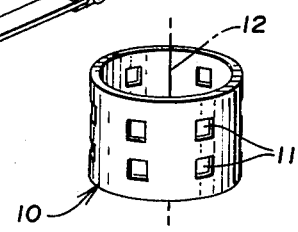
FIG. 3 is a perspective view of only the sleeve member of our geodesic dome joist connector, shown on an intermediate scale.
Figure 2:
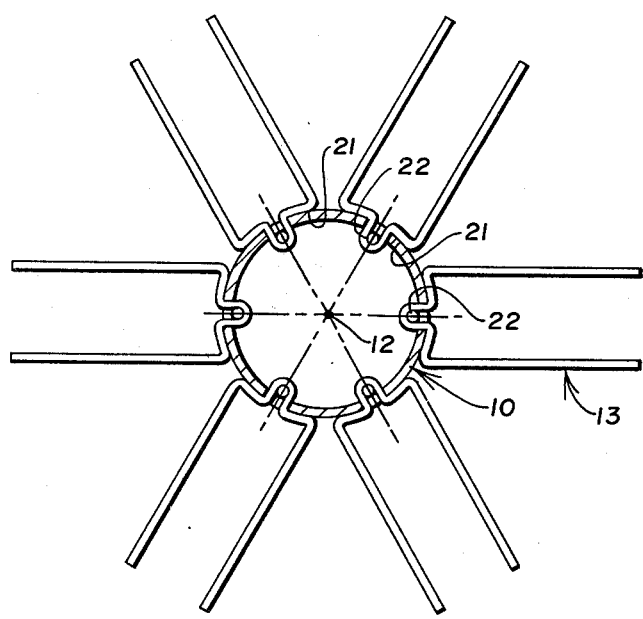
FIG. 2 is an end elevational view of one of our geodesic dome joist connectors, on an enlarged scale.
Figure 5:
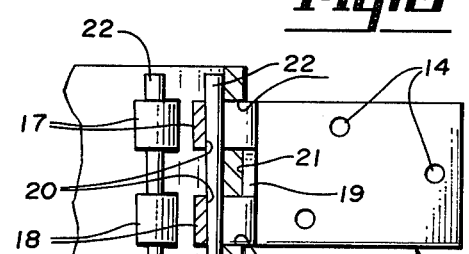
FIG. 5 is a fragmentary view of our geodesic dome joist connector in assembled or locked position with the tongue member shown in elevation and the sleeve member in section.

FIG. 1 shows in perspective a geodesic dome D constructed of a plurality of conventional triangularly shaped sections with one of our connectors located at each of the apexes thereof. The preferred form, as shown in FIGS. 2–5, is comprised of a rigid metal tube or sleeve 10 which has a plurality of openings 11 formed through its tubular wall structure and spaced circumferentially thereof. This sleeve or hub 10 serves as the central connecting element of the device and its longitudinal axis 12 defines the apex of the triangular panel areas as shown in FIGS. 2–3.

Associated with the sleeve is a plurality of tongue members 13, each of which is adapted to be fixedly secured as by bolts 14 to the adjacent end of one of the joists 15 which define the individual triangular sections 16 of the dome D.

Figure 4:
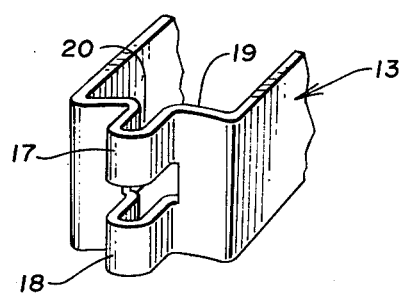
FIG. 4 is a perspective view of only the tongue member of our geodesic dome joist connector, shown on an enlarged scale.

Each tongue member 13 is integrally formed of a rectangular metal plate which, as shown in FIG. 4, is generally U-shaped and is bent to provide a pair of spaced but aligned tongues 17, 18 which extend outwardly from the base portion 19 of the U-shaped construction. Each tongue 17, 18 is formed so as to have an open generally U-shaped channel such as indicated by the numeral 20. The area of the base portion 19 between the tongues 17 and 18 is cut away to facilitate the insertion of the tongues into the openings 11. It will be seen by reference to FIG. 2 that the base portion 19 is somewhat arcuately formed as shown at 21 to conform to the curvature of the exterior surface of the sleeve 10.

A longitudinally tapered pin or wedge member 22 is inserted from above into the channel 17, 18 of each of the tongues 13 after the latter have been inserted into a pair of axially aligned openings 11. By so doing, the pins 22 bear against the interior surface of the sleeve 10 and the arcuate surfaces 21 of each of the tongue members 13 is cammed or wedged tightly against the exterior surface of the sleeve 11 and the tongue members 13 and sleeve are thereby interlocked. Thus the wedging action provided by the longitudinal taper of the pins 22 provides a rigid interlock which provides increased rigidity between the individual joists 15 of the dome.

From the above it will be seen that our new and improved connector is quick and easy to assemble and disassemble. Moreover, it is simple and inexpensive to manufacture. As described above, it automatically compensates for variations in dimensions of the individual triangular panels and provides increased rigidity between such panels. Since it is impossible for the sleeve and tongue member to separate as a result of bending and consequent detachment, our improved connector device provides increased safety which is of utmost importance in the construction of a geodesic dome. In addition, if any wear occurs between the elements of the connector, the pins 22, because of their weight, will automatically slip into a more tight and increased wedging relationship.

Wherever herein the term "geodesic dome" is utilized, it is intended to include by definition all those types of geodesic domes based upon any polyhedral construction.

It will, of course, be understood that various changes may be made in the form, details, arrangement and proportions of the parts without departing from the scope of the invention which consists of the matter shown and described herein and set forth in the appended claims.

We claim:

1. A geodesic dome triangular panel area roof connector member for interconnecting joists defining such an area comprising:
   (a) a junction point member comprising a generally cylindrical sleeve member having rigid wall structure and a plurality of circumferentially spaced openings extending radially through said wall structure, and having an axis defining the apex of the triangular panel area;
   (b) a joist element defining a side of the triangular panel area;
   (c) a rigid open generally U-shaped tongue member carried by one end portion of said joist element and extending longitudially outwardly therefrom and radially inwardly through one of said sleeve openings into the interior of said sleeve member, and
   (d) an interlock member constructed and arranged to engage and fixedly interlock with the portion of said tongue member extending through said opening into the confines of said sleeve member, to thereby interlock said tongue member and said joist element in fixed relation to the exterior of said sleeve member.

2. A geodesic dome triangular panel area roof connector for interconnecting the adjacent ends of outwardly extending, rigid, panel-supporting joists defining such an area, said connector comprising:
  (a) a junction point element comprising a generally cylindrical sleeve member having rigid wall structure and at least one opening extending radially through said wall structure, and having an axis defining the apex of the triangular panel area while interconnecting such joists;
  (b) a plurality of tongue members each having an open channel therein and constructed and arranged to be fixedly connected to one of the adjacent ends of such joists to extend longitudinally outwardly from one end thereof and radially inwardly through one of said sleeve member openings into the interior of said sleeve member; and
  (c) a plurality of rigid interlock members constructed and arranged to engage and fixedly interlock with the portion of one of said tongue members which extends through one of said openings into the confines of the interior of said sleeve member, to thereby lock said tongue member and its associated joist in fixed relation to the exterior surface of said sleeve member.

3. The structure defined in claim 2 wherein at least one of said interlock members extends in piercing relation to its associated tongue member.

4. The structure defined in claim 2 wherein at least one of interlock members includes a wedge element extending in piercing relation to said tongue member and bearing against the interior surface of said sleeve member.

5. The structure defined in claim 2 wherein at least one of said tongue members includes an open terminal loop element, and said interlock means includes a wedge member extending through said loop element and wedging against the inner surface of said sleeve member adjacent said opening.

6. The structure defined in claim 2, wherein at least one of said members includes a plurality of aligned open looped tongue elements extending longitudinally outwardly from the end of such a joist when connected thereto and extending radially inwardly through said openings in said sleeve member.

7. The structure defined in claim 2 wherein at least one of said tongue members includes a generally U-shaped plate member constructed and arranged to be fixedly connected to and across one end of one of such joists, said plate member including at least one open-channelled tongue element carried at the base of its U-shaped construction and extending longitudinally outwardly from one end of such a joist when attached thereto.

8. The structure defined in claim 2, wherein at least one of said tongue members has an axially extending open channel extending therethrough adjacent the inner surface of said sleeve member, and at least one of said interlock members is comprised of a tapered pin constructed and arranged to extend into said channel and wedge against the inner surface of said sleeve member to interlock said tongue member therewith.

9. The structure defined in claim 2 wherein at least one of said tongue members includes an open looped tongue element extending longitudinally outwardly when said tongue member is connected to the end of such a joist and extending radially inwardly through one of said openings in said sleeve member, and at least one of said interlock members is comprised of a wedge member extending through said looped tongue element and wedging against the interior surface of said sleeve member.

10. The structure defined in claim 2 wherein each of said tongue members is comprised of a generally U-shaped rigid plate constructed and arranged to be fixedly secured to one end of one of such joists, said plates each having a pair of spaced aligned open loop members integrally formed on the base portion of said U-shaped plate and extending outwardly therefrom through said openings of said sleeve member in axially spaced relation; and each of said interlock members being comprised of an elongated tapered wedge member extending through said loop members inwardly of said wall structure of said sleeve member and bearing against its inner surface in wedging relation.

11. A geodesic dome triangular panel area roof connector for fixedly connecting together the adjacent ends of a plurality of outwardly extending, rigid, panel-supporting joists defining such an area, said connector comprising:
  (a) a tubular member with rigid wall structure having a plurality of radially extending openings spaced circumferentially thereof and extending through said wall structure;
  (b) a plurality of open-channelled tongue members each constructed and arranged to be fixedly connected to the adjacent end of one of such joists to extend longitudinally outwardly therefrom and radially inwardly through one of said tubular member openings into the interior of said tubular member; and
  (c) a plurality of interlock members having at least one dimension exceeding a dimension of its associated opening and each being constructed and arranged to engage and fixedly interlock with the portion of one of said tongue members which extends through one of said openings into the confines of the interior of said tubular member, to thereby lock said tongue member and its associated joist in fixed relation to the exterior surface of said tubular member.

* * * * *